US012731879B2

(12) United States Patent
Li

(10) Patent No.: US 12,731,879 B2
(45) Date of Patent: Sep. 8, 2026

(54) TRANSMISSION LINE STRUCTURE AND FABRICATING METHOD OF THE SAME

(71) Applicants: HongQiSheng Precision Electronics (QinHuangdao) Co., Ltd., Hebei Province (CN); Avary Holding (Shenzhen) Co., Ltd., Shenzhen (CN); Garuda Technology Co., Ltd., New Taipei City (TW)

(72) Inventor: Cheng-Jia Li, Shenzhen (CN)

(73) Assignees: HongQiSheng Precision Electronics (QinHuangdao) Co., Ltd., Hebei Province (CN); Avary Holding (Shenzhen) Co., Ltd., Shenzhen (CN); Garuda Technology Co., Ltd., New Taipei City (TW)

( * ) Notice: Subject to any disclaimer, the term of this patent is extended or adjusted under 35 U.S.C. 154(b) by 110 days.

(21) Appl. No.: 18/776,615

(22) Filed: Jul. 18, 2024

(65) Prior Publication Data

US 2026/0024905 A1 Jan. 22, 2026

(51) Int. Cl.
*H01P 3/08* (2006.01)
*H01P 11/00* (2006.01)

(52) U.S. Cl.
CPC .............. *H01P 3/08* (2013.01); *H01P 11/003* (2013.01)

(58) Field of Classification Search
CPC ............. H01P 3/08; H01P 11/003; H01P 3/06
USPC .. 333/1, 4, 5, 236, 237, 238, 241, 243, 245, 333/246
See application file for complete search history.

(56) References Cited

U.S. PATENT DOCUMENTS 6,388,198 B1 * 5/2002 Bertin .................. H05K 1/0221 257/E21.597
7,608,909 B2 * 10/2009 Chinthakindi ........ H01P 11/003 257/E21.373
9,379,069 B2 * 6/2016 Chen ................... H10W 20/497

FOREIGN PATENT DOCUMENTS

| | | | |
|---|---|---|---|
| CN | 102237154 | A | 11/2011 |
| CN | 104103454 | A | 10/2014 |
| CN | 206649919 | U | 11/2017 |
| CN | 108109729 | A | 6/2018 |
| JP | 01-230404 | A | 9/1989 |
| TW | 201307183 | A | 2/2013 |
| TW | M475682 | U | 4/2014 |
| WO | WO-2018052466 | A1 | 3/2018 |

* cited by examiner

*Primary Examiner* — Jorge L Salazar, Jr.
(74) *Attorney, Agent, or Firm* — Muncy, Geissler, Olds & Lowe, P.C.

(57) ABSTRACT

A transmission line structure and a fabricating method of the same are provided. The transmission line structure includes a dielectric layer, a magnet member and a diamagnetism transmission line. The dielectric layer has a transmission cavity. The transmission cavity has an inner wall. The magnet member is disposed in the transmission cavity and is fixed to the inner wall. The magnet member generates a magnetic field. The diamagnetism transmission line can repel the magnetic field to be levitated in the transmission cavity.

10 Claims, 10 Drawing Sheets

TRANSMISSION LINE STRUCTURE AND FABRICATING METHOD OF THE SAME

BACKGROUND

Technical Field

The present application relates to a transmission in electrical communication technologies, and in particular, to a transmission line structure and a fabricating method of the same.

Prior Art

A common transmission line structure, such as a microstrip, an embedded microstrip, or a stripline, typically includes a signal trace and a dielectric layer. With the development of the current signal transmission towards high frequency and high speed, a dielectric factor (DF) and a dielectric constant (DK) of the dielectric layer affect the transmission quality. Therefore, the use of a transmission line structure with a low dielectric factor and a low dielectric constant has always been the goal of the development of high-speed and high-frequency systems.

SUMMARY

At least one embodiment of the present application provides a transmission line structure and a fabricating method of the same. Air is used as a dielectric material of the transmission line structure, thereby reducing a dielectric factor and a dielectric constant of the transmission line structure.

The transmission line structure provided by the at least one embodiment of the present application includes a dielectric layer, a magnet member and a first diamagnetism transmission line. The dielectric layer has a transmission cavity. The transmission cavity has an inner wall. The magnet member is disposed in the transmission cavity and is fixed to the inner wall. The magnet member generates a first magnetic field. The diamagnetism transmission line is configured to repel the first magnetic field to be levitated in the transmission cavity.

In the at least one embodiment of the present application, the magnet member includes two magnetic components. The first diamagnetism transmission line is levitated between the two magnetic components.

In the at least one embodiment of the present application, the magnet member surrounds the first diamagnetism transmission line.

In the at least one embodiment of the present application, the dielectric layer has a through-hole. The through-hole extends through the magnet member and communicates with the transmission cavity.

In the at least one embodiment of the present application, the transmission line structure further includes a magnetic layer and a second diamagnetism transmission line. The magnetic layer is disposed in the transmission cavity and is fixed to the inner wall. The magnetic layer is separated from the magnet member, and generates a second magnetic field. The second diamagnetism transmission line is configured to repel the first magnetic field and the second magnetic field to be levitated between the magnet member and the magnetic layer.

In the at least one embodiment of the present application, the dielectric layer has a first hole. The first hole extends through the magnetic layer and communicates with the transmission cavity. The magnet member has a second hole. The second hole communicates with the first hole and the transmission cavity.

In the at least one embodiment of the present application, the transmission line structure further includes an insulating layer. The insulating layer is disposed on the magnetic layer. The insulating layer is located between the magnetic layer and the second diamagnetism transmission line. The insulating layer is located at both ends of the transmission line structure.

In the at least one embodiment of the present application, the transmission line structure further includes an insulating layer. The insulating layer is disposed on the magnet member. The insulating layer is located between the magnet member and the first diamagnetism transmission line, or located between the magnet member and the second diamagnetism transmission line. The insulating layer is located at both ends of the transmission line structure.

In the at least one embodiment of the present application, the magnet member and the magnetic layer each have a thickness of 10-50 microns. The first diamagnetism transmission line and the second diamagnetism transmission line each have a thickness of 3-20 microns.

A fabricating method of the transmission line structure provided by the at least one embodiment of the present application includes: providing a first diamagnetism transmission line; disposing a first sacrificial layer covering the first diamagnetism transmission line; disposing a magnet member on the first sacrificial layer; disposing a dielectric layer covering the magnet member after the first sacrificial layer is disposed; and removing the first sacrificial layer after the dielectric layer is disposed.

In the at least one embodiment of the present application, the fabricating method further includes: disposing an insulating layer on the first sacrificial layer before the magnetic member is disposed on the first sacrificial layer, in which a surface of the first sacrificial layer has a groove, and the insulating layer is in the groove flush with the surface of the first sacrificial layer outside the groove.

In the at least one embodiment of the present application, the fabricating method further includes: forming a hole in the dielectric layer before the first sacrificial layer is removed, in which the hole extends through the magnet member.

In the at least one embodiment of the present application, the fabricating method further includes: disposing a second sacrificial layer covering the magnetic member before the dielectric layer is disposed, in which the magnetic member has a hole, and the second sacrificial layer is connected to the first sacrificial layer through the hole; disposing a second diamagnetism transmission line on the second sacrificial layer before the dielectric layer is disposed; disposing a third sacrificial layer covering the second diamagnetism transmission line before the dielectric layer is disposed, in which the third sacrificial layer and the second sacrificial layer are combined to cover the second diamagnetism transmission line; and disposing a magnetic layer on the third sacrificial layer before the dielectric layer is disposed. The dielectric layer covers the magnetic layer, and the first sacrificial layer, the second sacrificial layer and the third sacrificial layer are removed after the dielectric layer is disposed.

In the at least one embodiment of the present application, the fabricating method further includes: forming another hole in the dielectric layer before the first sacrificial layer, the second sacrificial layer and the third sacrificial layer are removed, in which the hole extends through the magnetic layer.

Based on the above, in the transmission line structure disclosed in the above embodiment, the diamagnetism transmission line is levitated in the transmission cavity, that is, air covers the diamagnetism transmission line, so that a dissipation factor and a dielectric constant of the transmission line structure are quite low to be suitable for transmitting high speed and high frequency signals.

BRIEF DESCRIPTION OF THE DRAWINGS

For a more complete understanding of embodiments and their advantages, the description below is made with reference to the drawings, where.

DETAILED DESCRIPTION

Figure 1:
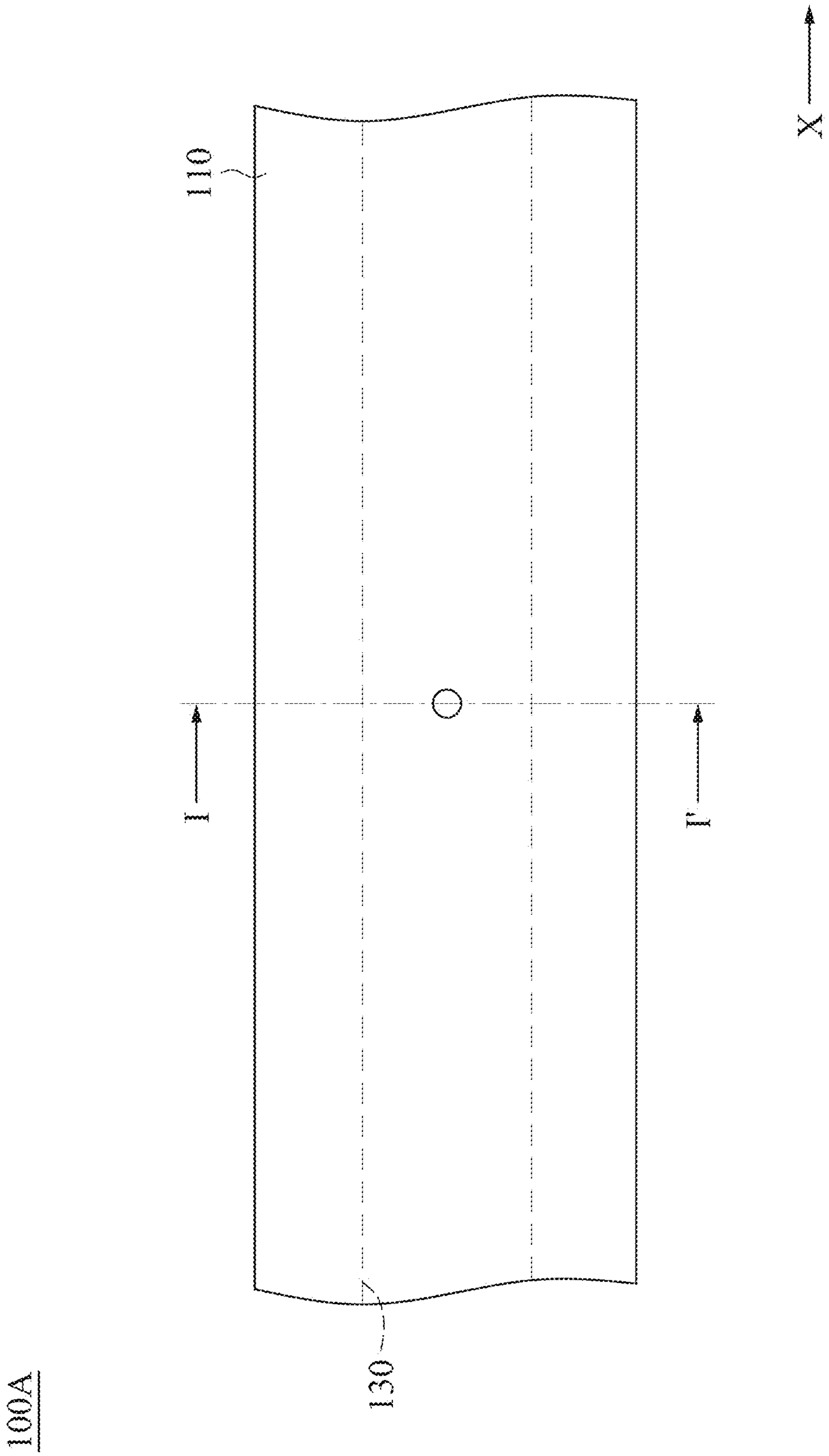
FIG. 1 is a local schematic top-view of a transmission line structure according to at least one embodiment of the present application.

In the following text, for clearly representing the technical features of the present application, the dimensions (such as length, width, thickness, and depth) of components (such as layers, membranes, substrates, and areas) in the figures will be scaled up disproportionately, and some components are reduced in number. Accordingly, the description and interpretation of the following embodiments below shall not be limited to the number of the components and the dimensions and shapes of the components shown in the figures, but shall encompass dimensions, shapes and deviations therebetween as a result of actual manufacturing processes and/or tolerances. For example, a flat surface shown in a figure may have a feature of roughness and/or nonlinearity, while an acute angle shown in a figure may be circular. Therefore, the components shown in the present application are mainly used for schematic purposes, and are not intended to accurately depict the actual shapes of the components, nor are they used to limit the claims of the patent application.

Secondly, the words “about”, “approximately” or “substantially” appearing herein encompass not only clearly recorded values and ranges of values, but also allowable deviation ranges understood by persons of ordinary skill in the art, wherein the deviation ranges may be determined by errors resulting from measurements, and the errors are due, for example, to limitations of both a measuring system and process conditions. In addition, the term “about” can mean within one or more standard deviations of the above values, such as +30%, +20%, +10% or +5%. The terms “about”, “approximately” or “substantially” as used in the present application may be used to select acceptable deviations ranges or standard deviations based on optical, etchable, mechanical or other properties, rather than a single standard deviation to apply all of the above optical, etchable, mechanical or other properties. In addition, for the purpose of clearly illustrating the following embodiments, functionally identical or similar components are indicated by same reference numerals.

Figure 2:
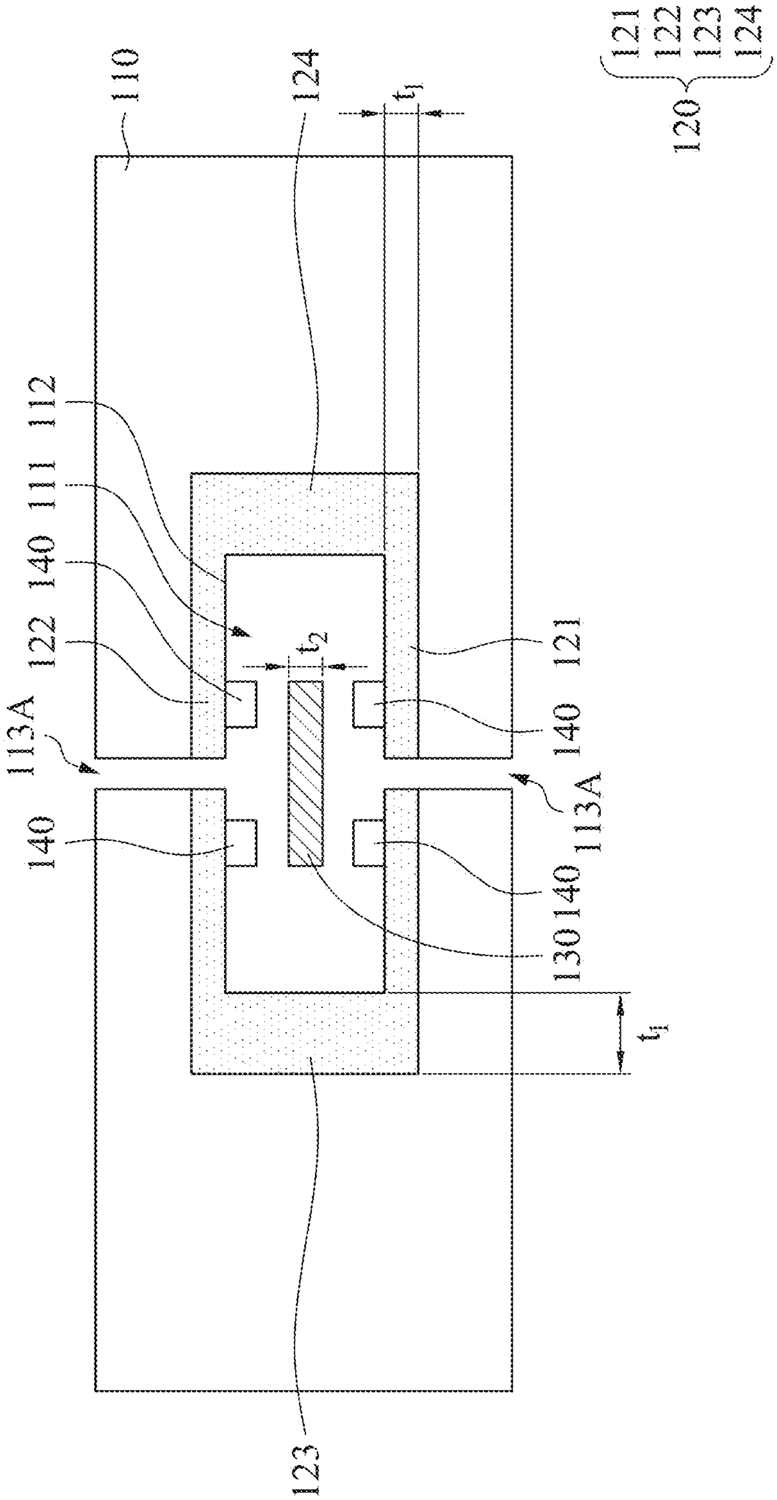
FIG. 2 is a cross-sectional view along a section line I-I' in FIG. 1.

FIG. 1 is a local schematic top-view of a transmission line structure 100A according to at least one embodiment of the present application, and FIG. 2 is a cross-sectional view along a section line I-I' in FIG. 1. Referring to FIGS. 1 and 2, the transmission line structure 100A can be configured to transmit electrical signals, and includes a dielectric layer 110, a magnet member 120, a diamagnetism transmission line 130, and a plurality of insulating layers 140.

The dielectric layer 110 has a transmission cavity 111, and the transmission cavity 111 has an inner wall 112. For example, the transmission cavity 111 is generally in the shape of a cuboid, that is, the transmission cavity 111 can define a cuboid-shaped space, but is not limited to this. The inner wall 112 includes an upper side surface, a lower side surface, a left side surface and a right side surface surrounding the transmission cavity 111, that is, the inner wall 112 is all the surfaces of the entire transmission cavity 111. In other embodiments, the transmission cavity 111 can be in the shape of a cylinder or a prism, or in other suitable shape.

The dielectric layer 110 can be made of a high-temperature-resistant ceramic material, such as aluminium oxide, aluminium nitride or kaolinite, or can be made of other materials, such as a polymer material, such as polypropylene or polycarbonate. In addition, an outer surface of the dielectric layer 110 can also be provided with a protective layer (not shown).

The magnet member 120 is disposed in the transmission cavity 111 and is fixed to the inner wall 112. The magnet member 120 may be a permanent magnet, such as an aluminum-nickel-cobalt permanent magnet alloy, an iron-chromium-cobalt permanent magnet alloy, a permanent magnet ferrite or rare earth permanent magnet material, or a composite permanent magnet material such as a rubber magnet containing permanent magnet ferrite. The magnet member 120 may also be an electromagnet. The magnet member 120 includes at least one magnetic component 121-124. For example, the magnet member 120 includes four magnetic components 121-124. These magnetic components 121-124 are generally membrane-like, and are fixed to the inner wall 112, for example, fixed to the upper side surface, the lower side surface, the left side surface and the right side surface of the cuboid. The magnet member 120 is configured to generate a magnetic field in the transmission cavity 111.

A thickness $t_1$ of the magnet member 120 may be 10-50 microns. In other words, the thickness $t_1$ of each of the magnetic components 121-124 may be 10-50 microns. It should be noted that the thicknesses $t_1$ of the magnetic components 121-124 can be the same or different, which is not limited. The dielectric layer 110 has two through-holes 113A, and these through-holes 113A extend through the magnet member 120 and communicate with the transmission cavity 111. These through-holes 113A are required for a fabricating process such that the transmission cavity 111 communicates externally with the transmission line structure 100A, and thus the number of the through-hole is not limited. The dielectric layer 110 may also have only one through-hole 113A, or three or more through-holes 113A.

The diamagnetism transmission line 130 is disposed in the transmission cavity 111. For example, the magnet member 120 surrounds the diamagnetism transmission line 130. Since the diamagnetism transmission line 130 has diamagnetism, the diamagnetism transmission line 130 will generate, in an external magnetic field (a magnetic field generated by the magnet member 120), a magnetic moment in a direction opposite to the external magnetic field, and thus repel the external magnetic field. When a repelling force of the diamagnetism transmission line 130 on the magnet member 120 is in balance with a gravity of the diamagnetism transmission line 130, the diamagnetism transmission line 130 can be levitated in the transmission cavity 111. A linewidth of the diamagnetism transmission line 130 is determined by a trace width of a high-speed system to which the diamagnetism transmission line is electrically connected. A thickness $t_2$ of the diamagnetism transmission line 130 is 3-20 microns.

Further, when the diamagnetism transmission line 130 is levitated, it is equivalent that air covers the diamagnetism transmission line 130. Since a dissipation factor and a dielectric constant of air are quite low, air is an excellent dielectric material, so that the transmission line structure 100A is suitable for transmitting high speed and high frequency signals. The material of the diamagnetism transmission line 130 may be a material with significant diamagnetism, e.g., pyrolytic carbon or pyrolytic graphite.

The material of the diamagnetism transmission line 130 may also be a type I superconductor, or a type II superconductor. The type I superconductor enters a superconducting state at a temperature below a critical temperature and in a magnetic field below a critical magnetic field, and is levitated due to the Meissner effect. The type II superconductor enters a superconducting state at a temperature below a critical temperature and in a magnetic field below a first critical magnetic field, and similar to the type I superconductor, is levitated due to the Meissner effect. In particular, the type II superconductor enters a mixed state at a temperature below the critical temperature and in a magnetic field between the first critical magnetic field and a second critical magnetic field, and is levitated due to a flux pinning effect.

It should be noted that the material of the above diamagnetism transmission line 130 can be a suitable material selected according to a specific working environment. For example, if the working environment is below 0° C., the type I superconductor or the type II superconductor can be used as the material of the diamagnetism transmission line 130. In addition, liquid nitrogen or liquid helium may be added to the transmission cavity 111 to achieve a working temperature of the type I superconductor or the type II superconductor.

It is worth mentioning that when the transmission line structure 100A is used in a working state in which it will not move at will, the magnet member 120 can also include only one magnetic component 121. When the repelling force of the diamagnetism transmission line 130 on the magnetic component 121 is in balance with the gravity of the diamagnetism transmission line 130, the diamagnetism transmission line 130 can also be levitated in the transmission cavity 111. In addition, the magnet member 120 can also include only two magnetic components 121 and 122, so that the diamagnetism transmission line 130 is levitated between the two magnetic components 121 and 122 when a force balance is achieved.

The plurality of insulating layers 140 are disposed on the magnet member 120, and each of the insulating layers 140 is located between a part of the magnet member 120 and the diamagnetism transmission line 130. In particular, these insulating layers 140 correspond to both ends of the radial section of the diamagnetism transmission line 130 in FIG. 2, but these insulating layers 140 may also correspond to and protrude from the both ends of the radial section of the diamagnetism transmission line 130 in other embodiments, which is not limited. In addition, the insulating layers 140 are located at both ends of the transmission line structure 100A (i.e., at both ends of the transmission line structure 100A in a direction X). The plurality of insulating layers 140 are configured to keep the diamagnetism transmission line 130 in a safe levitation state. In detail, when the transmission line structure 100A is electrically connected to the high-speed system, the insulating layers 140 are configured to avoid a short circuit caused by an unstable levitation of the diamagnetism transmission line 130. The insulating layers 140 may be made of epoxy resin, polyvinyl chloride, polypropylene, polytetrafluoroethylene or polyimide.

Figure 3:
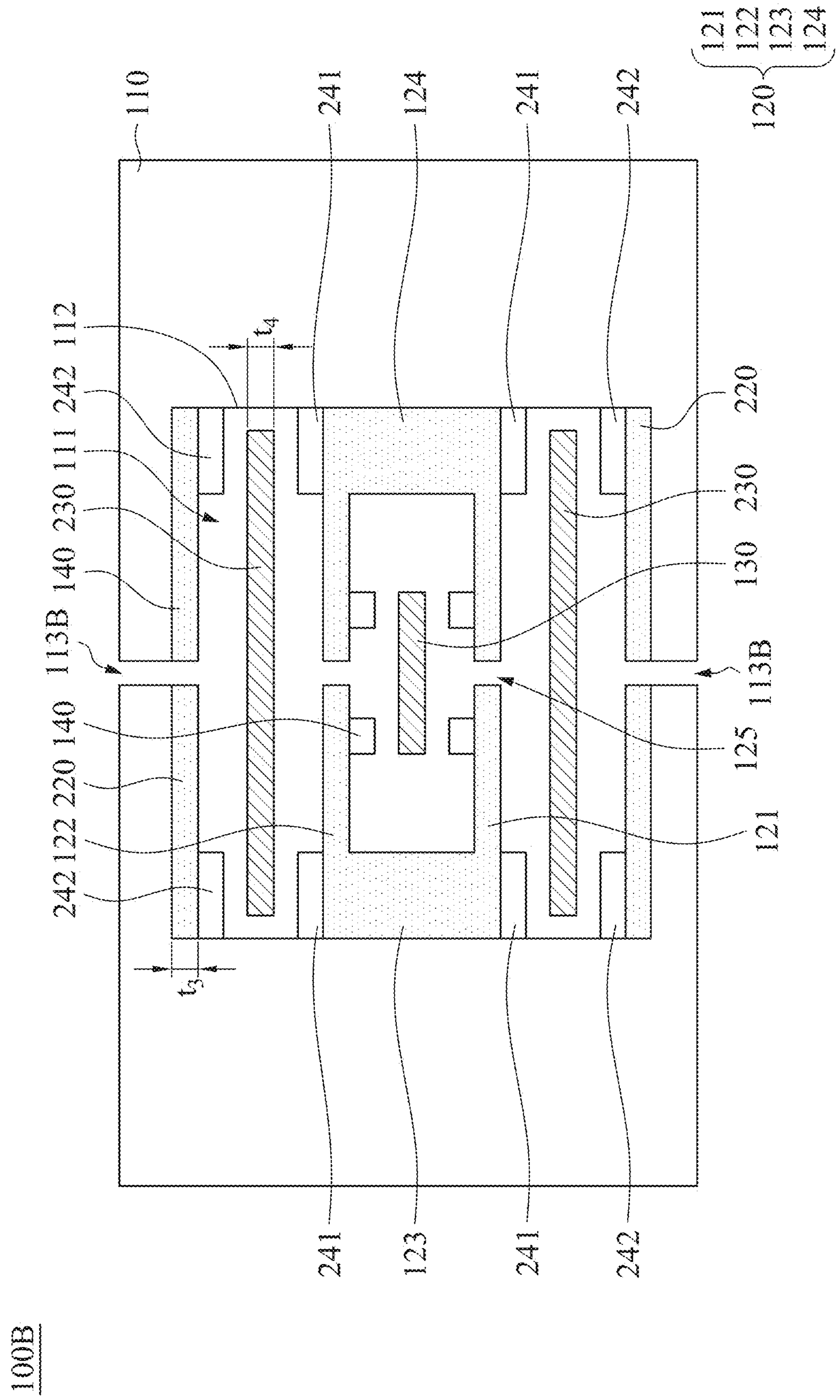
FIG. 3 is a cross-sectional view of a transmission line structure according to another embodiment of the present application.

FIG. 3 is a cross-sectional view of a transmission line structure 100B according to another embodiment of the present application. Referring to FIG. 3, the transmission line structure 100B is similar to the transmission line structure 100A in FIG. 2, and the transmission line structure 100B differs from the transmission line structure 100A in that: the transmission line structure 100B further includes at least one magnetic layer 220, at least one diamagnetism transmission line 230 and a plurality of insulating layers 241, 242. The at least one magnetic layer 220 is also disposed in the transmission cavity 111 and is fixed to the inner wall 112 and is separated from the magnet member 120. The at least one magnetic layer 220 may be made of a material same as that of the magnet member 120 for generating a magnetic field in the transmission cavity 111. The at least one magnetic layer 220 may also have a thickness t3 of 10-50 microns.

The at least one diamagnetism transmission line 230 may be made of a material same as that of the diamagnetism transmission line 130. The at least one diamagnetism transmission line 230 is configured to repel magnetic fields generated by the magnet member 120 and the at least one magnetic layer 220 to be levitated between the magnet member 120 and the at least one magnetic layer 220. Furthermore, a linewidth of the at least one diamagnetism transmission line 230 is determined by a trace width of a high-speed system to which the diamagnetism transmission line is electrically connected. The linewidth of the at least one diamagnetism transmission line 230 may be the same as or different from the linewidth of the diamagnetism transmission line 130, which is not limited. A thickness t4 of the at least one diamagnetism transmission line 230 may be 3-20 microns.

For example, the transmission line structure 100B includes two magnetic layers 220 and two diamagnetism transmission lines 230. The magnetic components 123 and 124 are respectively fixed to the left and right side surfaces of the inner wall 112, and the magnetic components 121 and 122 are connected between the magnetic components 123 and 124. The two magnetic layers 220 are fixed to the upper and lower side surfaces of the inner wall 112 respectively. The two diamagnetism transmission lines 230 are levitated between the magnetic layers 220 and the magnetic component 121, and between the magnetic layers 220 and the magnetic component 122, respectively.

The material of the plurality of insulating layers 241 and 242 may be the same as that of the insulating layers 140, and the plurality of insulating layers 241 and 242 are configured to keep the diamagnetism transmission line 230 in a safe levitation state to avoid a short circuit caused by an unstable levitation of the diamagnetism transmission line 230. The insulating layers 241 are disposed on the magnet member 120, and are located between the magnet member 120 and the diamagnetism transmission lines 230. The insulating layers 242 are disposed on these magnetic layers 220 and are located between these magnetic layers 220 and these diamagnetism transmission lines 230. These insulating layers 241 and 242 correspond to both ends of the radial section of these diamagnetism transmission lines 230, respectively, and these insulating layers 241 and 242 protrude to overlap with the inner wall 112. In addition, similar to the insulating layers 140, the insulating layers 241 and 242 are located at both ends of the transmission line structure 100B (i.e., similar to both ends of the transmission line structure 100A in the direction X as shown in FIG. 1).

In addition, the dielectric layer 110 has two holes 113B, and these holes 113B extend through the magnetic layers 220 and communicate with the transmission cavity 111. The magnet member 120 has two holes 125 (i.e., two holes 125 on the magnetic components 121 and 122 respectively), and these holes 125 communicate with the holes 113B and the transmission cavity 111. These holes 113B and 125 are required for the fabricating process such that spaces between the magnetic layers 220 and the magnet member 120 and a space in the magnet member 120 communicate externally with the transmission line structure 100B, and thus the number of the hole is not limited. The transmission line structure 100B can levitate more diamagnetism transmission lines 130 and 230, thus achieving the needs of a plurality of transmission paths.

Figure 4:
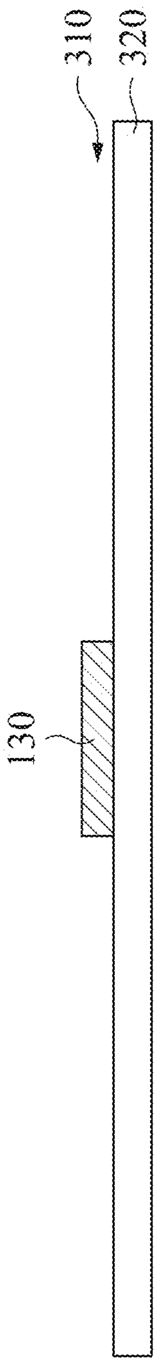
FIG. 4 is a cross-sectional view of a step of providing a diamagnetism transmission line in a fabricating method of the transmission line structure in FIG. 3.

FIG. 4 is a cross-sectional view of a step of providing the diamagnetism transmission line 130 in a fabricating method of the transmission line structure 100B in FIG. 3. Referring to FIG. 4, first, a diamagnetic material layer 310 is provided, where the diamagnetic material layer 310 is disposed on a substrate 320. The substrate 320 may be a metal layer, e.g., a copper layer. Alternatively, the substrate 320 may be an insulating layer, e.g., a polyimide layer. The substrate 320 can be connected to the diamagnetic material layer 310 via a pressure sensitive adhesive. The diamagnetic material layer 310 is then patterned to form the diamagnetism transmission line 130. For example, the diamagnetic material layer 310 is etched to form the diamagnetism transmission line 130.

Figure 5:
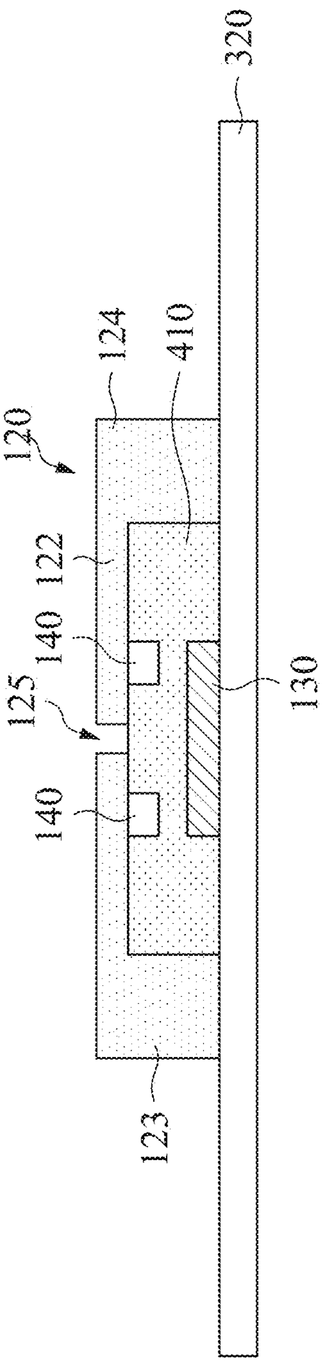
FIG. 5 is a cross-sectional view of steps of disposing a sacrificial layer, insulating layers and one part of a magnet member in the fabricating method of the transmission line structure in FIG. 3.

FIG. 5 is a cross-sectional view of steps of disposing a sacrificial layer 410, the insulating layers 140 and one part of the magnet member 120 in the fabricating method of the transmission line structure 100B in FIG. 3. Referring to FIGS. 4 and 5, first, the sacrificial layer 410 is disposed, and a surface of the sacrificial layer 410 has two grooves. For example, a sacrificial layer material is coated on the diamagnetism transmission line 130 and the substrate 320 to form the sacrificial layer 410 that covers the diamagnetism transmission line 130 and is in contact with the substrate 320. The sacrificial layer 410 may be made of polyvinyl carbonate or propylene carbonate. Then, an insulating material is disposed in the grooves, for example, the insulating material is coated in the grooves to form the insulating layers 140 in the grooves. The insulating layers 140 are flush with the surface of the sacrificial layer 410 outside the grooves.

A magnetic material is then disposed on the sacrificial layer 410 and the insulating layers 140, for example, the magnetic material is printed on the sacrificial layer 410 and the insulating layers 140 to form the magnet member 120 (the magnetic component 122 and part of the magnetic components 123, 124), where the magnet member 120 covers the sacrificial layer 410 and has a hole 125.

Figure 6:
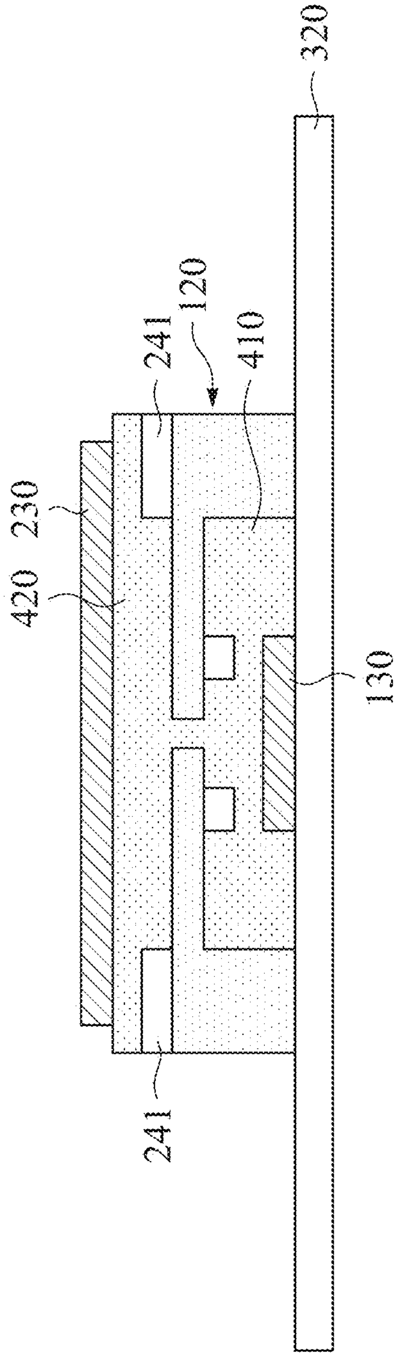
FIG. 6 is a cross-sectional view of steps of disposing insulating layers, a sacrificial layer and a diamagnetism transmission line in the fabricating method of the transmission line structure in FIG. 3.

FIG. 6 is a cross-sectional view of steps of disposing the insulating layers 241, a sacrificial layer 420 and the diamagnetism transmission line 230 in the fabricating method of the transmission line structure 100B in FIG. 3. Referring to FIGS. 5 and 6, the insulating layers 241, the sacrificial layer 420 and the diamagnetism transmission line 230 are arranged sequentially on the magnet member 120. For example, first, the magnet member 120 is coated with an insulating material to form the insulating layers 241. Next, a sacrificial layer material is coated on the surfaces of the insulating layers 241 and the magnet member 120 to form the sacrificial layer 420, where the material of the sacrificial layer 420 may be the same as that of the sacrificial layer 410. The sacrificial layer 420 is connected to the sacrificial layer 410 through the hole 125. A diamagnetic material is then printed on the sacrificial layer 420 to form the diamagnetism transmission line 230, where a width of the diamagnetism transmission line 230 is less than that of the sacrificial layer 420.

Figure 7:
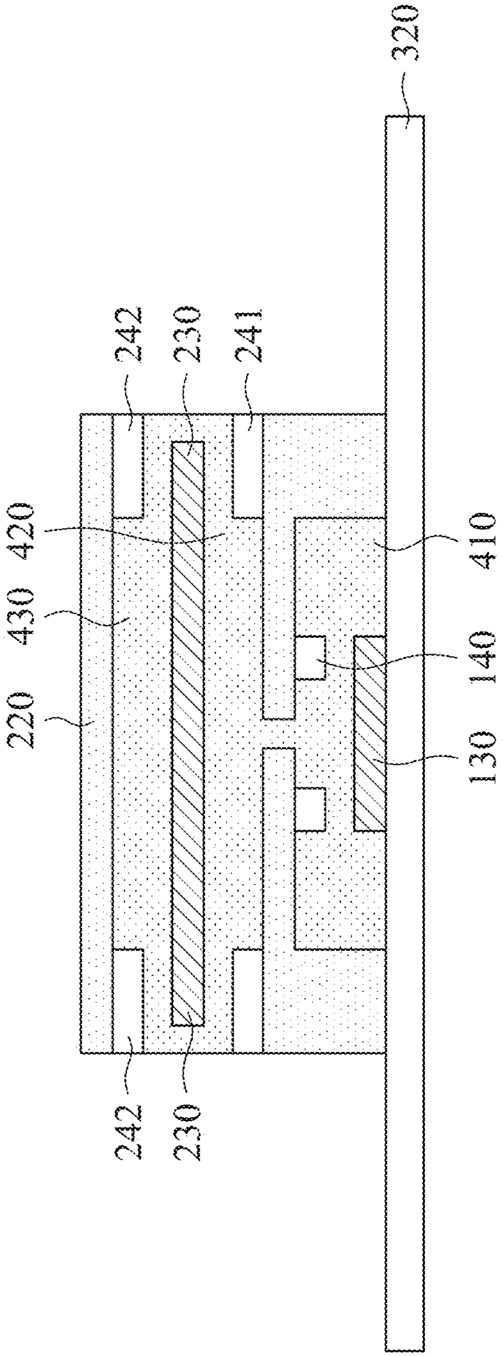
FIG. 7 is a cross-sectional view of steps of disposing a sacrificial layer, insulating layers and a magnetic layer in the fabricating method of the transmission line structure in FIG. 3.

FIG. 7 is a cross-sectional view of steps of disposing a sacrificial layer 430, the insulating layers 242 and the magnetic layer 220 in the fabricating method of the transmission line structure 100B in FIG. 3. Referring to FIGS. 6 and 7, the sacrificial layer 430, the insulating layers 242 and the magnetic layer 220 are arranged sequentially on the diamagnetism transmission line 230. For example, first, a sacrificial layer material is coated on the diamagnetism transmission line 230 to form the sacrificial layer 430, where the material of the sacrificial layer 430 may also be the same as the material of the sacrificial layers 410 and 420. The sacrificial layer 430 and the sacrificial layer 420 are combined to cover the diamagnetism transmission line 230, and the surface of the sacrificial layer 430 has two grooves. The grooves are then coated with an insulating material to form the insulating layers 242. The insulating layers 242 are flush with the surface of the sacrificial layer 430 outside the grooves. Then, a magnetic material is printed on the insulating layers 242 and the sacrificial layer 430 to form the magnetic layer 220.

Figure 8:
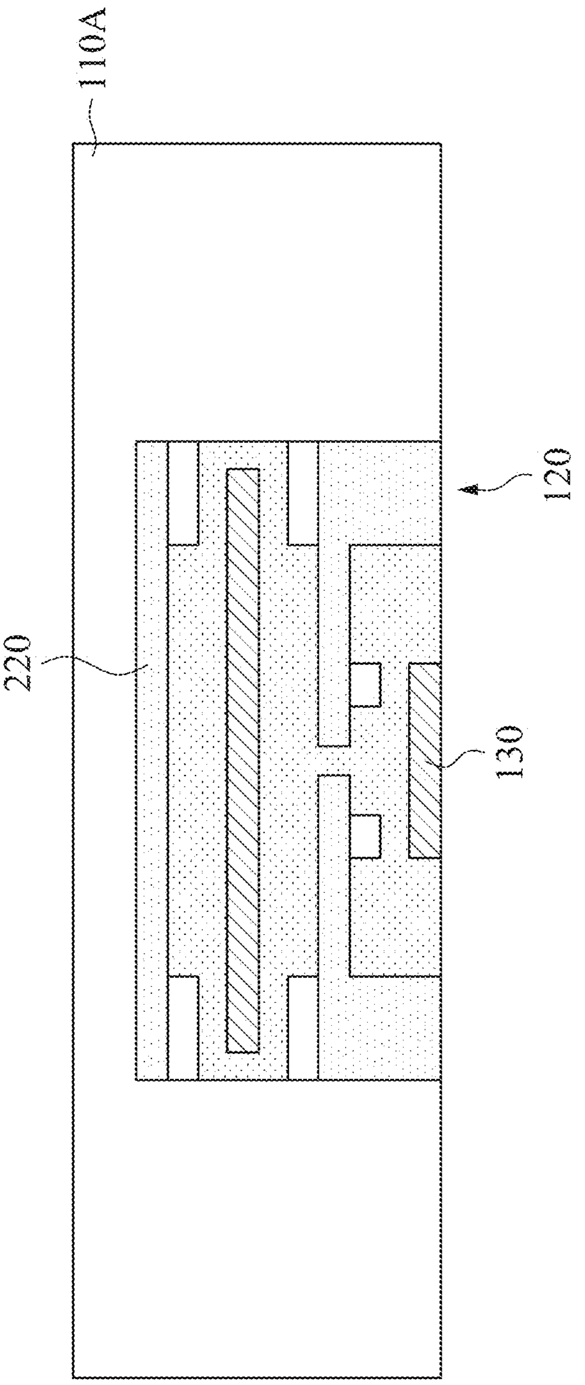
FIG. 8 is a cross-sectional view of steps of disposing a dielectric layer and removing a substrate in the fabricating method of the transmission line structure in FIG. 3.

FIG. 8 is a cross-sectional view of steps of disposing a dielectric layer 110A and removing the substrate 320 in the fabricating method of the transmission line structure 100B in FIG. 3. Referring to FIGS. 7 and 8, first, the dielectric layer 110A is disposed on the magnetic layer 220 and the substrate 320, where a width of the dielectric layer 110A may be the same as that of the substrate 320, and the dielectric layer 110A covers the magnetic layer 220. Then, the substrate 320 is removed. For example, when the substrate 320 is a metal layer, the substrate 320 can be removed by etching. When the substrate 320 is connected to the diamagnetism transmission line 130 via the pressure sensitive adhesive, the pressure sensitive adhesive and the substrate 320 can be removed by peeling.

Figure 9:
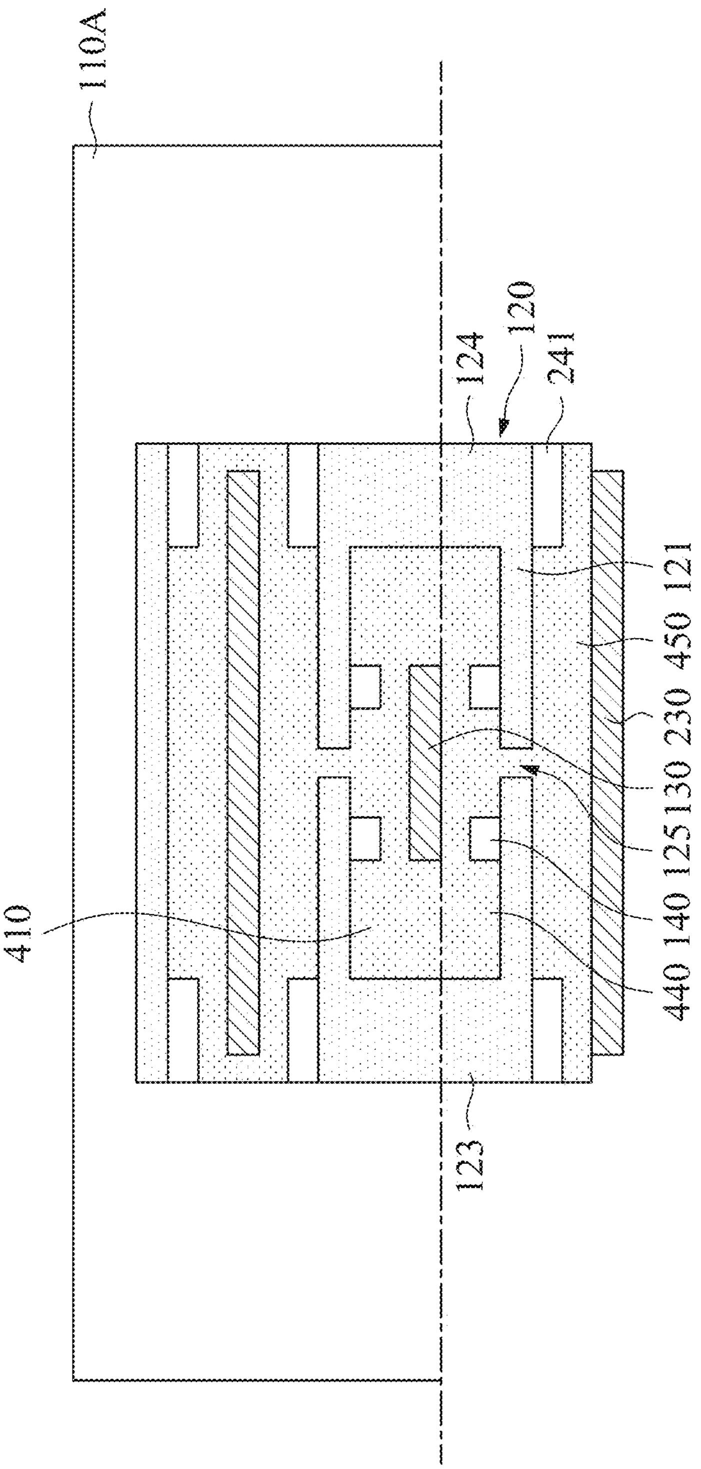
FIG. 9 is a cross-sectional view of steps of disposing sacrificial layers, insulating layers, the other part of the magnet member and a diamagnetism transmission line in the fabricating method of the transmission line structure in FIG. 3.

FIG. 9 is a cross-sectional view of steps of disposing sacrificial layers 440 and 450, the insulating layers 140 and 241, the other part of the magnet member 120 and the diamagnetism transmission line 230 in the fabricating method of the transmission line structure 100B in FIG. 3. Referring to FIGS. 8 and 9, the sacrificial layer 440, the insulating layers 140, the magnet member 120, the insulating layers 241, the sacrificial layer 450, and the diamagnetism transmission line 230 are disposed in sequence on the diamagnetism transmission line 130 (in a direction opposite to the dielectric layer 110A) to form a structure symmetrical to part of the structure in FIG. 6.

For example, a sacrificial layer material is coated on the diamagnetism transmission line 130 to form the sacrificial layer 440, where the material of the sacrificial layer 440 may also be the same as the material of the sacrificial layer 410. The sacrificial layer 440 and the sacrificial layer 410 are combined to cover the diamagnetism transmission line 130, and the surface of the sacrificial layer 440 has two grooves. Then, the grooves are coated with an insulating material to form the insulating layers 140. The insulating layers 140 are flush with the surface of the sacrificial layer 440 outside the grooves.

A magnetic material is then printed on the insulating layers 140 and the sacrificial layer 440 to form the magnet member 120 (the magnetic component 121 and part of the magnetic components 123, 124), where the magnet member 120 covers the sacrificial layer 440 and has the hole 125. An insulating material is coated on the magnet member 120 to form the insulating layers 241. Then, a sacrificial layer material is coated on the surfaces of the insulating layers 241 and the magnet member 120 to form the sacrificial layer 450, where the material of the sacrificial layer 450 may be the same as that of the sacrificial layer 440. The sacrificial layer 450 is connected to the sacrificial layer 440 through the hole 125. A diamagnetic material is then printed on the sacrificial layer 450 to form the diamagnetism transmission line 230, where the width of the diamagnetism transmission line 230 is less than that of the sacrificial layer 450.

Figure 10:
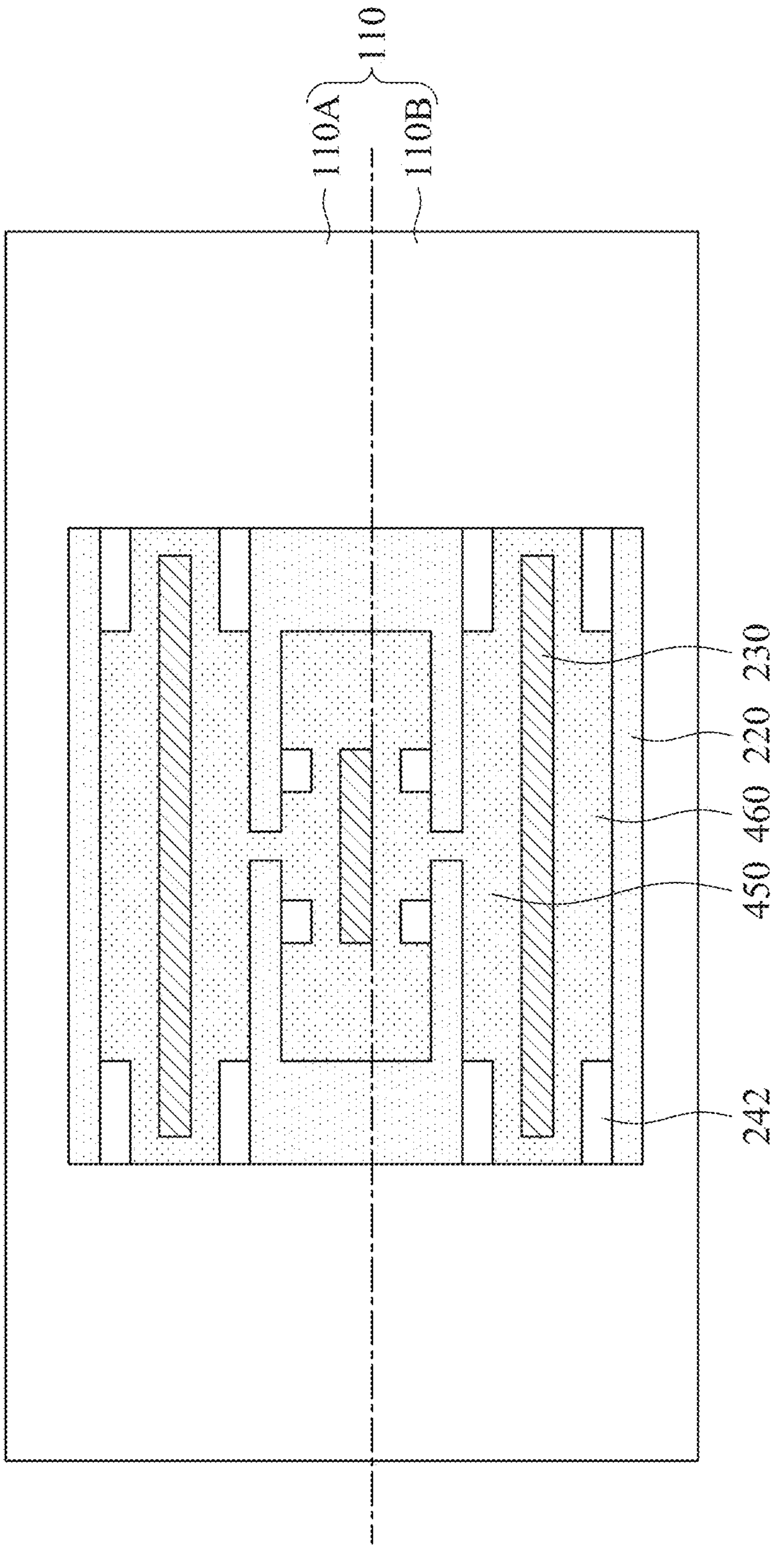
FIG. 10 is a cross-sectional view of steps of disposing a sacrificial layer, insulating layers, a magnetic layer and a dielectric layer in the fabricating method of the transmission line structure in FIG. 3.

FIG. 10 is a cross-sectional view of steps of disposing a sacrificial layer 460, the insulating layers 242, the magnetic layer 220 and a dielectric layer 110B in the fabricating method of the transmission line structure 100B in FIG. 3. Referring to FIGS. 9 and 10, the sacrificial layer 460, the insulating layers 242, the magnetic layer 220 and the dielectric layer 110B are disposed in sequence on the diamagnetism transmission line 230 (in the direction opposite to the dielectric layer 110A) to form a structure symmetrical to part of the structure in FIG. 8.

For example, a sacrificial layer material is coated on the diamagnetism transmission line 230 to form the sacrificial layer 460, where the material of the sacrificial layer 460 may also be the same as the material of the sacrificial layer 450. The sacrificial layer 460 and the sacrificial layer 450 are combined to cover the diamagnetism transmission line 230, and the surface of the sacrificial layer 460 has two grooves. Then, the grooves are coated with an insulating material to form the insulating layers 242. The insulating layers 242 are flush with the surface of the sacrificial layer 460 outside the grooves.

A magnetic material is then printed on the insulating layers 242 and the sacrificial layer 460 to form the magnetic layer 220. Then, the dielectric layer 110B is stacked on the magnetic layer 220, where the dielectric layer 110B can cover the magnetic layer 220 to be combined with the dielectric layer 110A to form the dielectric layer 110.

Figure 11:
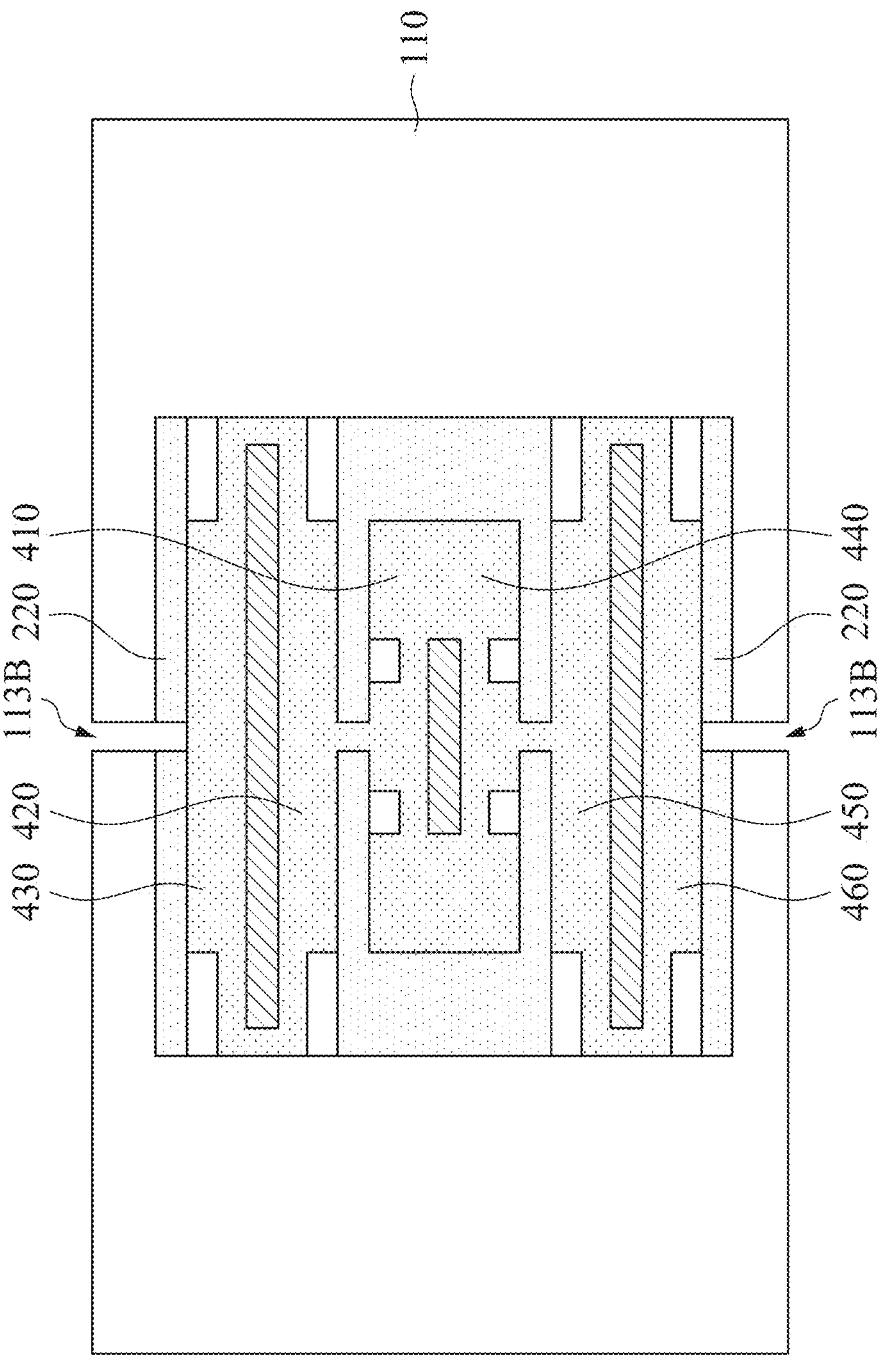
FIG. 11 is a cross-sectional view of a step of forming holes in the fabricating method of the transmission line structure in FIG. 3.

FIG. 11 is a cross-sectional view of a step of forming the holes 113B in the fabricating method of the transmission line structure 100B in FIG. 3. Referring to FIGS. 10 and 11, two holes 113B are formed in the dielectric layer 110, and these holes 113B extend through the magnetic layers 220. For example, these holes 113B may be formed by means of laser drilling. The sacrificial layers 410, 420, 430, 440, 450 and 460 can then be removed by injecting a removal solvent or a heated removal solvent (the removal solvent is, for example, an acidic solution) from the holes 113B so that the sacrificial layers 410, 420, 430, 440, 450 and 460 react with the removal solvent. In addition, the sacrificial layers 410, 420, 430, 440, 450 and 460 can also be removed by injecting gas or heated gas from the holes 113B. In this way, the fabrication of the transmission line structure 100B is completed.

In some other embodiments, the sacrificial layers 410, 420, 430, 440, 450, and 460 may be removed by thermal decomposition. In a thermal decomposition mode, the steps of forming the holes 125 and 113B in FIGS. 5, 9 and 11 may be omitted.

It should be noted that a fabricating method of the transmission line structure 100A is similar to that of the transmission line structure 100B. A difference is that in the fabricating method of the transmission line structure 100A, the steps in FIGS. 6 and 7 can be omitted, and in FIG. 8, the dielectric layer 110A is directly disposed on the magnet member 120 formed in FIG. 5, and then the substrate 320 is removed. Then, in the steps shown in FIG. 9, only the sacrificial layer 440, the insulating layers 140 and the magnet member 120 are disposed. Then, in the steps shown in FIG. 10, only the dielectric layer 110B is disposed. In addition, the magnet member 120 formed in FIGS. 5 and 9 may not have the holes 125. In the steps shown in FIG. 11, the two holes 113B formed on the dielectric layer 110 extend through the magnet member 120 (e.g., through-holes 113A in FIG. 2). In this way, the fabrication of the transmission line structure 100A is completed. The magnet member 120 can then be magnetized to generate the magnetic field, or be electrified to generate the magnetic field.

In summary, in the transmission line structures 100A and 100B disclosed in the above embodiments, when the diamagnetism transmission lines 130 and 230 are levitated in the transmission cavity 111, it is equivalent that air covers the diamagnetism transmission lines 130 and 230, so that the dissipation factors and the dielectric constants of the transmission line structures 100A and 100B are quite low to be suitable for transmitting high speed and high frequency signals. In addition, the transmission line structure 100B can levitate more diamagnetism transmission lines 130 and 230 through the coordination of the magnet member 120 and the magnetic layers 220, so as to achieve the needs of a plurality of transmission paths.

Although the present application has been disclosed as above in embodiments, the embodiments are not intended to limit the present application, and those of ordinary skill in the art may make some changes and embellishments within the spirit and scope of the present application, therefore, the scope of protection of the present application shall be defined in the attached claims.

What is claimed is:

1. A transmission line structure, comprising:

a dielectric layer having a transmission cavity, wherein the transmission cavity has an inner wall;

a magnet member disposed in the transmission cavity and fixed to the inner wall, wherein the magnet member generates a first magnetic field; and a first diamagnetism transmission line configured to repel the first magnetic field to be levitated in the transmission cavity.

2. The transmission line structure according to claim 1, wherein the magnet member comprises two magnetic components, wherein the first diamagnetism transmission line is levitated between the two magnetic components.

3. The transmission line structure according to claim 1, wherein the magnet member surrounds the first diamagnetism transmission line.

4. The transmission line structure according to claim 1, wherein the dielectric layer has a through-hole extending through the magnet member and communicating with the transmission cavity.

5. The transmission line structure according to claim 1, further comprising:

a magnetic layer disposed in the transmission cavity and fixed to the inner wall, wherein the magnetic layer is separated from the magnet member and generates a second magnetic field; and a second diamagnetism transmission line configured to repel the first magnetic field and the second magnetic field to be levitated between the magnet member and the magnetic layer.

6. The transmission line structure according to claim 5, wherein the dielectric layer has a first hole extending through the magnetic layer and communicating with the transmission cavity, and wherein the magnet member has a second hole, and the second hole communicates with the first hole and the transmission cavity.

7. The transmission line structure according to claim 5, further comprising an insulating layer disposed on the magnetic layer;

wherein the insulating layer is located between the magnetic layer and the second diamagnetism transmission line; and wherein the insulating layer is located at both ends of the transmission line structure.

8. The transmission line structure according to claim 5, further comprising an insulating layer disposed on the magnet member;

wherein the insulating layer is located between the magnet member and the first diamagnetism transmission line, or located between the magnet member and the second diamagnetism transmission line; and wherein the insulating layer is located at both ends of the transmission line structure.

9. The transmission line structure according to claim 5, wherein the magnet member and the magnetic layer each have a thickness of 10-50 microns.

10. The transmission line structure according to claim 5, wherein the first diamagnetism transmission line and the second diamagnetism transmission line each have a thickness of 3-20 microns.

* * * * *